United States Patent [19]

Ohkoda et al.

[11] Patent Number: 4,907,098
[45] Date of Patent: Mar. 6, 1990

[54] INFORMATION RECORDING-REPRODUCING APPARATUS

[75] Inventors: Keiji Ohkoda; Kenichi Suzuki; Kazuo Minoura, all of Yokohama, Japan

[73] Assignee: Canon Kabushiki Kaisha, Tokyo, Japan

[21] Appl. No.: 219,883

[22] Filed: Jul. 11, 1988

Related U.S. Application Data

[63] Continuation of Ser. No. 861,873, May 12, 1986, abandoned.

[30] Foreign Application Priority Data

May 17, 1985 [JP] Japan .................................. 60-103875
Oct. 18, 1985 [JP] Japan .................................. 60-231390

[51] Int. Cl.$^4$ ......................... G11B 5/00; G11B 19/00; G11B 17/00
[52] U.S. Cl. .................................... 360/2; 369/213; 369/247
[58] Field of Search ........................................... 360/2

[56] References Cited

U.S. PATENT DOCUMENTS 3,633,186  1/1972  Lynott et al. ..................... 360/107
4,121,249 10/1978  Lemelson ........................... 358/132
4,514,837  4/1985  Van Rosmalen .................. 360/106

Primary Examiner—Vincent P. Canney
Attorney, Agent, or Firm—Fitzpatrick, Cella, Harper & Scinto

[57] ABSTRACT

An information recording-reproducing apparatus includes a holding bed for holding a card-like or sheet-like information recording medium, a head for recording information on the information recording medium or reproducing the information recorded on the information recording medium, a device for reciprocally rectilinearly moving the holding bed relative to the head, and a device operatively associated with the movement of the holding bed, reciprocally moving a body of a predetermined weight. The device prevents shock during the reversal of the holding bed.

17 Claims, 3 Drawing Sheets

INFORMATION RECORDING-REPRODUCING APPARATUS

This application is a continuation of application Ser. No. 861,873 filed May 12, 1986, now abandoned.

BACKGROUND OF THE INVENTION

1. Field of the Invention

This invention relates to an information recording-reproducing apparatus in which an information recording medium and a head unit for information-processing the medium are reciprocally moved relative to each other to thereby accomplish recording or reproduction of information.

The information recording-reproducing apparatus in the present invention means an apparatus for only recording information, an apparatus for only reproducing information or an apparatus for both recording and reproducing information.

2. Related Background Art

There are magnetic and optical methods for the information recording-reproducing apparatus as described above, and in recent years, attention has been paid to the optical methods. Apparatuses of the type which uses a light beam to accomplish recording and reproduction of information include apparatuses using a rotating optical disc which is a disc-like recording medium, a reciprocally $ moved optical card which is a card-like recording medium, or an optical tape which is a tape-like recording medium. These apparatuses have their own features and are used properly in conformity with their purposes and applications. The optical card has an increasing range of uses, making the most of its features, such as ease of manufacture, good portability and good accessibility.

Detection of the information on the optical card, as in other optical information recording-reproducing apparatuses, is accomplished by applying a light beam to a minute recording pit on the order of 1 $\mu$–5 $\mu$, and detecting variations in the light beam by the recording pit (for example, variations in reflectance, transmittance, angle of polarization, etc.).

An optical head used in an apparatus of this type which uses such a minute recording pit to optically accomplish recording and reproduction must indispensably have auto-focusing and auto-tracking functions. Consequently, an objective for condensing a light beam on the recording pit is controlled by a servo circuit so as to be movable in the focus direction (the direction of the optic axis of the objective) and the track direction (the direction orthogonal to the recording track) and always be present at a proper position so as to follow the fluctuation of the position of the objective relative to the recording medium. The movable portion including this objective is often supported by a minute metal plate spring, a rubber or similar elastic member, etc, but is usually restrained chiefly by a magnetic force during operation. Therefore, the optical head is generally vulnerable to vibration and, if a shock exceeding a predetermined limit is applied to the apparatus, the optical head will depart from its range of control and thus, recording and reproduction will become impossible.

Particularly, where the recording medium is reciprocally moved to thereby accomplish recording and reproduction, the shock when the direction of movement of the medium is reversed is great. In such a system, vibration is very great as compared with a system in which the medium is rotated to thereby accomplish recording and reproduction. This makes it difficult to use an optical head having auto-focusing and auto-tracking functions, and accordingly makes recording and reproduction of high density and high speed very difficult, which also has led to problems regarding the durability and quietude of the apparatus. Also, in the conventional magnetic recording apparatuses, the vibration during reversal has been great, and this has posed a serious problem in recording and reproducing information.

SUMMARY OF THE INVENTION

The present invention has for its object to solve the above-noted problems and to alleviate the shock produced when the direction of movement of a recording medium and a holding bed therefor is reversed during high-speed reciprocal movement, thereby realizing recording and reproduction of high reliability, high density and high speed.

In an information recording-reproducing apparatus wherein a card-like or sheet-like information recording medium is placed on a holding bed and the holding bed is reciprocally moved relative to a recording-reproducing head to thereby accomplish recording or reproduction, the above object is achieved by reciprocally rectilinearly moving the reciprocally movable portion and a body of a weight substantially equal to the weight thereof in directions parallel with and opposite to each other.

DESCRIPTION OF THE PREFERRED EMBODIMENTS

Several embodiments of the present invention will hereinafter be described with reference to the drawings. The present invention can also be applied to conventional magnetic apparatuses, but for simplicity, an optical apparatus will be described as an example.

Figure 1:
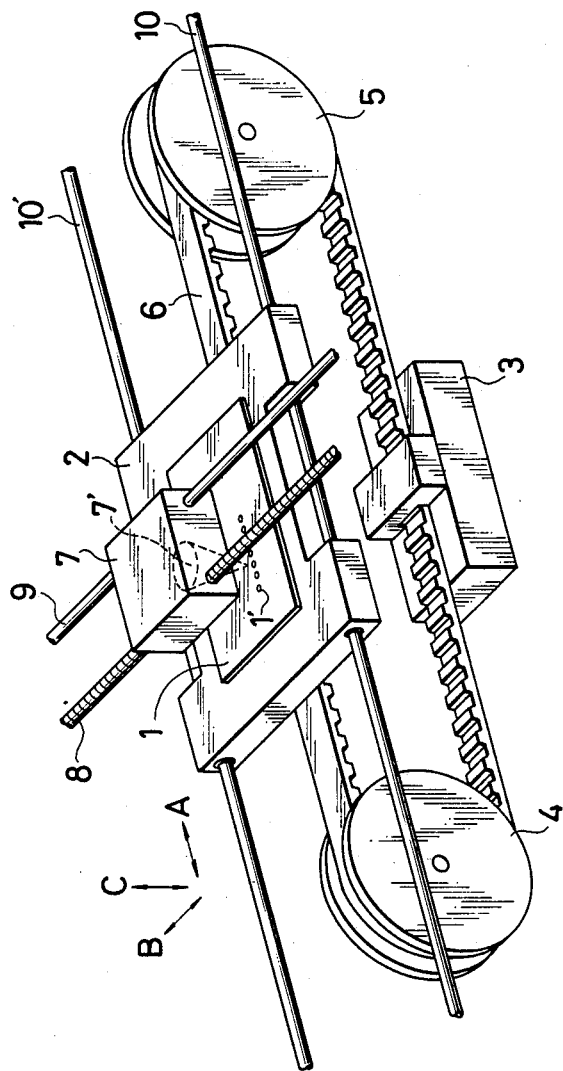
FIGS. 1, 2, 3, 4, 5 and 6 are schematic views respectively showing different embodiments of the information recording-reproducing apparatus according to the present invention.

FIG. 1 is a schematic perspective view showing a first embodiment of the optical information recording-reproducing apparatus of the present invention.

In FIG. 1, reference numeral 1 designates an optical recording card, reference numeral 2 denotes a holding bed for holding the card 1 thereon, reference numeral 3 designates a counter weight having a weight substantially equal to the total weight of the card 1 and holding bed 2, and reference numerals 4 and 5 denote a driving pulley and a driven pulley, respectively. A belt 6 is passed over these pulleys.

The card holding bed 2 and the counter weight 3 are both fixed to the straight portions of the belt 6, but are disposed so as to be rectilinearly moved in opposite directions.

In the above-described construction, the driving pulley 4 repeats reversal at a certain period, and the card holding bed 2 effects reciprocal rectilinear movement within the rang of the straight portion of the belt 6.

Reference numeral 7 designates an optical recording-reproducing head which is drivable in the direction of arrow B and controlled so as to be able to accomplish recording and reproduction at a desired position. That portion of the head 7 which includes an objective 7' is drivable in both the focus direction (the direction of arrow C) and the track direction (the direction of arrow B) to follow any fluctuation occurring in the focus direction and the track direction and is controlled so as to be always placed at an optimum position.

The optical head 7 is supported by a feed screw 8 and a head feeding guide 9 and is movable in the direction of arrow B as previously described. The feed screw 8 and the head feeding guide 9 are fixed to a chassis, not shown, by fixing means, not shown. Also, the card holding bed 2 is supported by card feeding guides 10 and 10' and is movable in the direction of arrow A. The card feeding guides 10 and 10' are fixed to the chassis by fixing means, not shown. The driving pulley 4 and the driven pulley 5 are supported by a driving shaft, a driven shaft, a motor, etc., all not shown, which are connected to the chassis.

Therefore, if the card is reciprocally moved at a high speed without the counter weight 3 being mounted, any shock produced during the reversal of the card holding bed 2 will be transmitted to the chassis through the belt 6, the pulleys 4, 5, the driving shaft, the motor, etc. and further to the optical head 7 through the fixing means and the optical head supporting members 8, 9. That portion of the optical head 7 which includes the objective 7' is very sensitive to any shock as previously mentioned, and if a shock exceeding the magnetic force which restrains the position of the objective 7' is applied to that portion, the objective 7' will be moved and the position thereof relative to a pit 1' on the card 1 will deviate, thus making desired recording and reproduction impossible.

In contrast, where the counter weight 3 is mounted, any shock produced in the direction of arrow A is negated in principle and the vibration or the like stays within a predetermined range and thus, it becomes possible to maintain normal recording and reproduction.

On the other hand, instead of providing the counter weight 3 as in the present invention, it is also possible to provide some shock-absorbing mechanism in a route through which the shock during the reversal of the holding bed 2 is transmitted to the head 7.

However, since the head 7 must be maintained at a desired positional relation relative to the card 1, it is desirable that no shock-absorbing mechanism be present between the head 7 and the chassis. Consequently, a shock-absorbing mechanism is provided on the fixing means or the like for fixing the belt 6, the drive shaft and the motor to the chassis. During recording and reproduction, the card 1 must be moved at a desired speed and only during the reversal, does shock-absorbing action become requisite. Therefore, the apparatus becomes complex and expensive and at the same time, malfunctioning or the like is very likely to hamper highly reliable recording and reproduction, and this is not practical.

Figure 2:
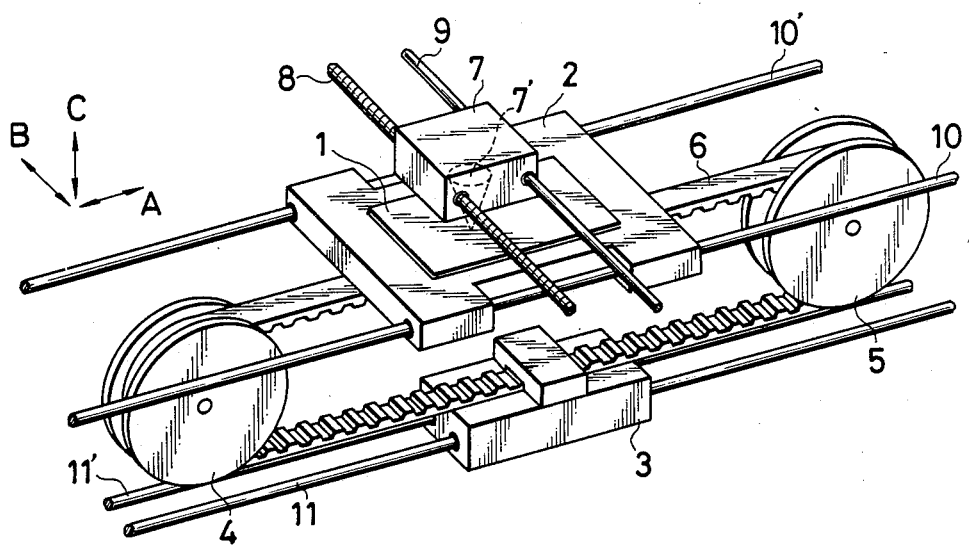

FIG. 2 is a schematic perspective view showing a second embodiment of the optical information recording-reproducing apparatus according to the present invention. In FIG. 2, members similar to those shown in FIG. 1 are given similar reference numerals and need not be described. The difference of the embodiment shown in FIG. 2 from the embodiment shown in FIG. 1 is that the counter weight 3 is also supported by a support mechanism. That is, in FIG. 2, two through-holes extending in the direction of arrow A are formed in the counter weight 3 having a weight substantially equal to the total of the weight of the card holding bed 2 and the weight of the card 1, and guide members 11 and 11' are slidably fitted in these through-holes, respectively. These guide members are both fixed to the chassis, not shown. As in the apparatus shown in FIG. 1, reciprocal movement of the card holding bed 2 in the direction of arrow A causes reciprocal movement of the counter weight 3 in the direction of arrow A. The direction of movement of the counter weight 3 is always opposite to the direction of movement of the card holding bed 2. During such reciprocal movement, the upper moving portion of the belt 6 and the lower moving portion of the belt 6 do not sag due to the weight of the card holding bed 2 and the counter weight 3 because the card holding bed 2 and the counter weight 3 are both fitted to their respective guide members. Accordingly, the tension of the belt 6 is not intensified by the weight of the counter weight 3 and therefore there is not the disadvantage that the load resistance of the motor for driving the driving pulley 4 is increased. Also, in the moving system comprising the pulleys, the belt, the card holding bed and the counter weight, the force in the direction of arrow A is negated and thus, no strong shock is produced during the reciprocal movement.

Figure 3:
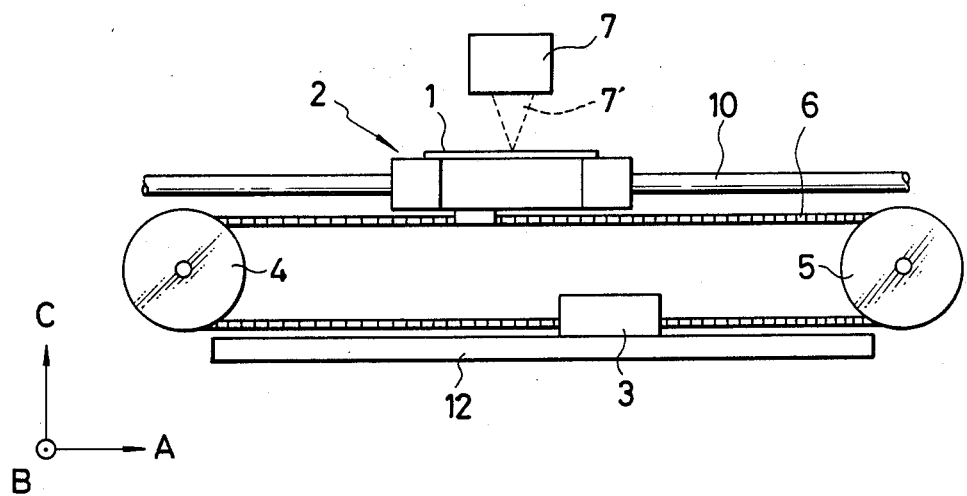

FIG. 3 shows a third embodiment of the information recording-reproducing apparatus according to the present invention. In FIG. 3, members similar to those in the previously described embodiments are given similar reference numerals. In the third embodiment, the guide means of the counter weight 3 differs from the guide means shown in FIG. 2. That is, in FIG. 3, reference numeral 12 designates a guide plate disposed below the counter weight 3 in parallel with a plane A-B. The counter weight 3 has its bottom surface planary formed so that it slides on the guide plate 12 during reciprocal movement. By so forming the guide plate, an effect similar to the effect shown in FIG. 2 can be achieved.

Figure 4:
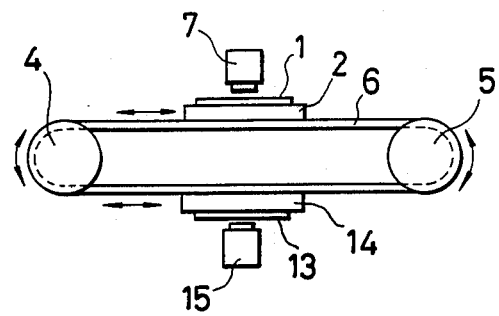
Figure 5:
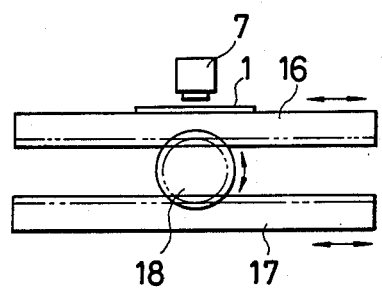
Figure 6:
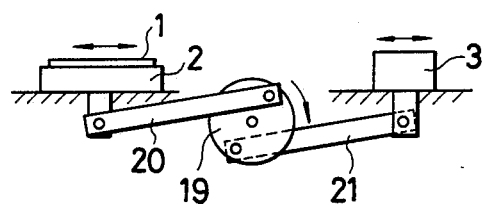

Embodiments of the present invention shown in FIGS. 4 to 6 differ more or less in form from the embodiments shown in FIGS. 1 to 3, but in these embodiments, similar members are given similar reference numerals. In the fourth embodiment of the information recording-reproducing apparatus according to the present invention shown in FIG. 4, a second card-like recording medium 13 and a second card holding bed 12 are provided at a position whereat the counter weight 3 was disposed in the embodiment shown in FIG. 1, and the card holding bed 12 is secured to the belt 6. Again in the present embodiment, the total weight of the recording medium 13 and the medium holding bed 14 is made equal to the total weight of the recording medium 1 and the medium holding bed 2, whereby there is obtained an effect equal to that of the counter weight 3 in the first embodiment.

Further, it is also possible to provide recording-reproducing heads 7 and 5 for the recording mediums 1 and 13, respectively, to read information from the medium 1 and at the same time, record the information on the medium 13 or record the information on the mediums 1 and 13 at a time.

FIG. 5 is a schematic view showing a fifth embodiment of the present invention in which a rack and a gear are used instead of a belt and pulleys. In FIG. 5, the card-like recording medium 1 is fixed to a card holding bed 16. The holding bed 16 and counter weight 17 are both provided with rack portions which are in meshing engagement with a driving gear 18. The holding bed 16 and counter weight 17 are held for sliding movement in the left to right direction as viewed in FIG. 5, and when the driving gear 18 repeats its reversal at a certain period, the medium 1 effects reciprocal rectilinear movement and the counter weight performs a function similar to what has been previously described.

FIG. 6 is a schematic view showing a sixth embodiment of the present invention in which a crank 19 and connecting rods 20, 21 are used to reciprocally rectilinearly move the holding bed 2 and the counter weight 3.

As previously described, these embodiments are effective not only for optical recording-reproducing apparatuses, but also for magnetic and other recording-reproducing apparatuses of high density in which the relative positional relation between the head and the medium must always be kept constant.

It is apparent that these embodiments are also effective not only for card-like recording mediums but also for sheet-like recording mediums.

According to the present invention, as described above, shock or the like produced during the reversal of the reciprocal movement can be reduced by an easy and inexpensive mechanism and highly reliable recording and reproduction becomes possible.

What is claimed is:

1. An information recording-reproducing apparatus comprising:
   first holding means for holding a card-like or sheet-like information recording medium;
   a first head for recording information on said information recording medium or reproducing the information recorded on said information recording medium held by said first holding means;
   first means for reciprocally rectilinearly moving said first holding means relative to said head;
   second holding means for holding a card-like or sheet-like information recording medium; and
   second means for reciprocally moving said second holding means in a direction parallel with and opposite to the direction of movement of said first holding means, said second holding means being operatively associated with the movement of said first holding means.

2. An information recording-reproducing apparatus according to claim 1, wherein said first means for rectilinearly moving said first holding means is a rotatable belt to which said second holding means is secured.

3. An information recording-reproducing apparatus according to claim 1, wherein the weight of said first holding means is substantially equal to the weight of said second holding means.

4. An information recording-reproducing apparatus according to claim 1, further comprising a second head for recording information on said recording medium held by said second holding means or reproducing the information recorded on said recording medium by said second holding means.

5. An information recording-reproducing apparatus according to claim 1, wherein each of said first and second holding means is a holding bed.

6. An information recording-reproducing apparatus according to claim 1, wherein said first means and said second means are identical to each other.

7. An information recording-reproducing apparatus according to claim 4, wherein said moving means is a belt supported by two pulleys.

8. An information recording-reproducing apparatus according to claim 7, wherein second holding means is supported by guide means.

9. An information recording-reproducing apparatus according to claim 7, wherein said second holding means is supported by a planar support bed.

10. An optical information recording-reproducing apparatus comprising:
    holding means for holding a card-like or sheet-like optical information recording medium, said recording medium having a linearly-extending track;
    an optical head for optically recording information on the optical information recording medium or reproducing the information recorded on the optical information recording medium, said optical head including an objective which is controlled so as to be placed at an optimum position with respect to both a focus direction of said objective and at track direction of the track travelled by the recording medium;
    first means for reciprocally rectilinearly moving said holding means relative to said optical head in a track extending direction while said objective of said optical head is controlled so as to be placed at said optimum position, said optical head being stationary with respect to the track extending direction; and
    second means for reciprocally moving a body of a predetermined weight in association with the movement of said holding means, with said second means preventing shock during the reversal of said holding means, said objective being controlled so as to be placed at said optimum position during reversal of said holding means.

11. An optical information recording-reproducing apparatus according to claim 10, wherein said first means for rectilinearly moving said holding means is a rotatable belt to which said body of a predetermined weight is secured.

12. An optical information recording-reproducing apparatus according to claim 10, wherein the predetermined weight of said body is substantially equal to the sum of the weight of the information recording medium and the weight of said holding means.

13. An optical information recording-reproducing apparatus according to claim 10, wherein said holding means is a holding bed for holding the card-like or sheet-like information recording medium, and said second means moves a body of predetermined weight in a direction parallel to and opposite to the direction of movement of said holding bed while keeping an operative association with said holding bed.

14. An optical information recording-reproducing apparatus according to claim 13, wherein said first means and said second means are identical to each other.

15. An optical information recording-reproducing apparatus according to claim 14, wherein said moving means is a belt supported by two pulleys.

16. An optical information recording-reproducing apparatus according to claim 15, wherein said body of a predetermined weight is supported by guide means.

17. An optical information recording-reproducing apparatus according to claim 15, wherein said body of a predetermined weight is supported by a planar support bed.

* * * * *

UNITED STATES PATENT AND TRADEMARK OFFICE
CERTIFICATE OF CORRECTION

PATENT NO. : 4,907,098
DATED : March 6, 1990
INVENTOR(S) : Keiji Ohkoda, et al.

It is certified that error appears in the above-identified patent and that said Letters Patent is hereby corrected as shown below:

COLUMN 1:

Line 29, "$" should be deleted.

COLUMN 2:

Line 63, "rang" should read --range--.

COLUMN 5:

Line 57, "medium by" should read --medium held by--.

COLUMN 6:

Line 18, "at" should read --a--.

Signed and Sealed this

Third Day of November, 1992

Attest:

DOUGLAS B. COMER

*Attesting Officer*     Acting Commissioner of Patents and Trademarks